United States Patent
You et al.

(10) Patent No.: US 10,107,634 B2
(45) Date of Patent: Oct. 23, 2018

(54) VEHICLE SYSTEM AND NAVIGATION PATH SELECTING METHOD OF THE SAME

(71) Applicants: HYUNDAI MOTOR COMPANY, Seoul (KR); KIA MOTORS CORPORATION, Seoul (KR)

(72) Inventors: Hyun Jong You, Uiwang (KR); Jae Seok You, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 67 days.

(21) Appl. No.: 15/369,587

(22) Filed: Dec. 5, 2016

(65) Prior Publication Data
US 2017/0343366 A1 Nov. 30, 2017

(30) Foreign Application Priority Data
May 26, 2016 (KR) .................. 10-2016-0064964

(51) Int. Cl.
G01C 21/34 (2006.01)
G01C 21/36 (2006.01)
B60L 11/18 (2006.01)

(52) U.S. Cl.
CPC ...... *G01C 21/3469* (2013.01); *B60L 11/1861* (2013.01); *G01C 21/343* (2013.01); *G01C 21/3476* (2013.01); *G01C 21/3682* (2013.01)

(58) Field of Classification Search
CPC .............. G01C 21/3469; G01C 21/343; G01C 21/3682; B60L 11/11861
(Continued)

(56) References Cited

U.S. PATENT DOCUMENTS

2013/0261953 A1* 10/2013 Kiyama ............. G01C 21/3469
 701/400
2014/0163877 A1* 6/2014 Kiyama ............. G01C 21/3469
 701/533
(Continued)

FOREIGN PATENT DOCUMENTS

JP 2011-237186 A 11/2011
JP 2012002778 A 1/2012
(Continued)

OTHER PUBLICATIONS

Korean Office Action dated Apr. 7, 2017 issued Korean Patent Application No. 10-2016-0064964.
(Continued)

*Primary Examiner* — Yazan A Soofi
(74) *Attorney, Agent, or Firm* — McDermott Will & Emery LLP

(57) ABSTRACT

A vehicle system includes: a battery; an input; and a processor configured to receive a user input setting a navigation destination through the input, to retrieve one or more first paths from a current location to the navigation destination, to retrieve charging stations which are able to arrive with a current drivable distance when the current drivable distance is smaller than a driving distance up to the navigation destination, to retrieve one or more second paths passing through the charging stations, to calculate a time taken to arrive at the navigation destination for each of the one or more second paths, and to select one path of the one or more second paths based on the time taken to arrive at the navigation destination.

16 Claims, 5 Drawing Sheets

(58) Field of Classification Search
USPC .......................................................... 701/410
See application file for complete search history.

(56) References Cited

U.S. PATENT DOCUMENTS

| | | | | |
|---|---|---|---|---|
| 2014/0214321 A1* | 7/2014 | Kawamata | ......... | G01C 21/3469 |
| | | | | 701/533 |
| 2014/0379183 A1* | 12/2014 | Long | ..................... | B60W 40/12 |
| | | | | 701/22 |
| 2015/0294228 A1* | 10/2015 | Saito | ..................... | G06Q 10/04 |
| | | | | 706/48 |
| 2015/0294329 A1* | 10/2015 | Saito | ................. | G06Q 30/0202 |
| | | | | 705/7.31 |
| 2015/0298565 A1* | 10/2015 | Iwamura | ............. | B60L 11/1844 |
| | | | | 701/22 |
| 2017/0010116 A1* | 1/2017 | Inoue | ..................... | B60L 1/003 |
| 2017/0074671 A1* | 3/2017 | Yoshimura | ....... | G08G 1/096716 |

FOREIGN PATENT DOCUMENTS

| | | |
|---|---|---|
| JP | 2012-118599 A | 6/2012 |
| JP | 2013-167460 A | 8/2013 |
| JP | 2014-032041 A | 2/2014 |
| JP | 2014-240757 A | 12/2014 |
| KR | 10-2012-0116162 A | 10/2012 |
| KR | 10-2014-0015740 A | 2/2014 |
| KR | 10-2015-0012776 A | 2/2015 |
| KR | 10-2015-0052965 A | 5/2015 |

OTHER PUBLICATIONS

Korean Office Action issued in Application No. 10-2016-0064964 dated Nov. 1, 2017, with English translation.
Korean Office Action issued in Application No. 10-2017-0125525 dated Nov. 1, 2017, with English translation.
Korean Notice of Allowance issued in Application No. 10-2017-0125525 dated Jun. 1, 2018.

* cited by examiner

VEHICLE SYSTEM AND NAVIGATION PATH SELECTING METHOD OF THE SAME

CROSS-REFERENCE TO RELATED APPLICATION

This application is based on and claims the benefit of priority to Korean Patent Application No. 10-2016-0064964, filed on May 26, 2016 in the Korean Intellectual Property Office, the disclosure of which is incorporated herein in its entirety by reference.

TECHNICAL FIELD

The present disclosure relates to a method and system of guiding a path passing through a charging station charging a battery included in a vehicle.

BACKGROUND

In accordance with the development of an electronic technology, various kinds of electronic devices have also been applied to a vehicle. In particular, a technology of driving a motor using power supplied from a battery in addition to raw materials such as gasoline, gas, and the like, has been recently developed.

An electric vehicle using the battery as a power source of the vehicle needs to periodically charge the battery for driving. A charging station infrastructure is expanded, but is insufficient to freely drive the electric vehicle.

SUMMARY

The present disclosure has been made to solve the above-mentioned problems occurring in the prior art while advantages achieved by the prior art are maintained intact.

An aspect of the present disclosure provides a vehicle system capable of selecting an optimal path passing through a charging station taking account of a navigation destination in an environment in which a charging station infrastructure is insufficient, and a navigation path selecting method of the same.

According to an exemplary embodiment of the present disclosure, a vehicle system includes: a battery; an input; and a processor set to receive a user input setting a navigation destination through the input, to retrieve one or more first paths from a current location to the destination, to retrieve charging stations which are able to arrive with a current drivable distance when the current drivable distance is smaller than a driving distance up to the destination, to retrieve one or more second paths passing through the charging stations, to calculate a time taken to arrive at the destination for each of the one or more second paths, and to select one path of the one or more second paths based on the time taken to arrive at the destination.

According to another exemplary embodiment of the present disclosure, a navigation path selecting method of a vehicle system includes: receiving a user input setting a navigation destination through an input; retrieving one or more first paths from a current location to the destination; retrieving charging stations which are able to arrive with a current drivable distance when the current drivable distance is smaller than a driving distance up to the destination; retrieving one or more second paths passing through the charging stations; calculating a time taken to arrive at the destination for each of the one or more second paths; and selecting one path of the one or more second paths based on the time taken to arrive at the destination.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
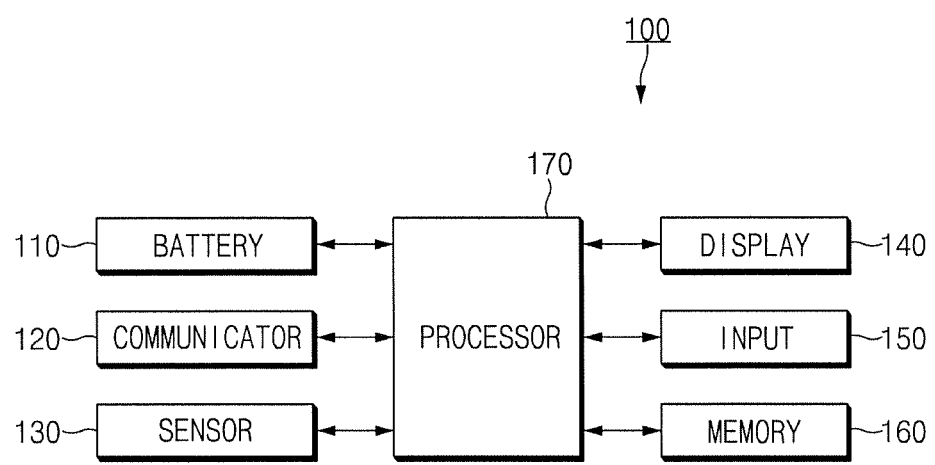
FIG. 1 is a block diagram illustrating a configuration of a vehicle system according to various exemplary embodiments of the present disclosure.

FIG. 1 is a block diagram illustrating a configuration of a vehicle system according to various exemplary embodiments of the present disclosure.

Referring to FIG. 1, a vehicle system 100 may include a battery 110, a communicator 120, a sensor 130, a display 140, an input 150, a memory 160, and a processor 170.

According to an exemplary embodiment, the battery 110 may supply power to the respective components included in the vehicle system 100. For example, the battery 110 may supply the power to the communicator 120, the sensor 130, the display 140, the input 150, the memory 160, and the processor 170. As another example, the battery 110 may supply the power to a motor of a vehicle including the vehicle system 100. The vehicle including the vehicle system 100 may be a hybrid vehicle or an electric vehicle that drives the motor using the power supplied from the battery 110. According to an exemplary embodiment, the battery 110 may be implemented as a secondary battery which is chargeable or dischargeable.

According to an exemplary embodiment, the vehicle system 100 may further include a power management module (not shown). The power management module (not shown) may control the battery to manage the power of the vehicle system. According to an exemplary embodiment, the power management module (not shown) may include a power management integrated circuit (PMIC), a charger integrated circuit (IC), or a battery or fuel gauge. The battery gauge may measure, for example, a residual quantity, a voltage, a current, or a temperature of the battery 110.

According to an exemplary embodiment, the communicator 120 may communicate with an external device. According to an exemplary embodiment, the communicator 120 may include a wireless-fidelity (Wi-Fi) module and a global navigation satellite system (GNSS) module. The communicator 120 (e.g., the GNSS module) may receive, for example, location information and real-time traffic information from a satellite. The communicator 120 (e.g., the Wi-Fi module) may communicate with, for example, a charging station through a server.

According to an exemplary embodiment, the sensor 130 may sense a sate of the vehicle. For example, the sensor 130 may sense a speed or a driving distance of the vehicle. The sensor 130 may sense, for example, revolution per minute (RPM) of a motor (not shown), and calculate the speed or the driving distance of the vehicle using the RPM of the vehicle. The sensor 130 may sense, for example, a wheel speed, and calculate the speed or the driving distance of the vehicle using the wheel speed.

According to an exemplary embodiment, the display 140 may display a variety of information (contents). According to an exemplary embodiment, the display 140 may be disposed on a center fescia or a cluster of the vehicle. According to an exemplary embodiment, the display 140 may display a user interface for setting a navigation destination. According to an exemplary embodiment, the display 140 may display path guidance information.

According to an exemplary embodiment, the input 150 (or a user input device or module) may receive (or sense) a user input. According to an exemplary embodiment, the input 150 may include a touch sensor panel sensing a touch operation of a user or a pen sensor panel (e.g., a digitizer) sensing a pen operation of the user. According to an exemplary embodiment, the input 150 may include a motion recognition sensor recognizing a motion of the user or a voice recognition sensor recognizing voice of the user.

According to an exemplary embodiment, the input 150 may receive the user input setting the navigation destination. According to an exemplary embodiment, the input 150 may receive the user input setting a charging amount of battery.

According to an exemplary embodiment, the display 140 and the input 150 may also be implemented, for example, as a touch screen having an input panel disposed on a display panel to simultaneously perform the display and the sensing of the touch operation.

According to an exemplary embodiment, the memory 160 may store information associated with the user interface for charging the battery. According to an exemplary embodiment, for example, the memory 160 may store average fuel efficiency information of the vehicle. According to an exemplary embodiment, the memory 160 may store an application (or a program) providing navigation information.

According to an exemplary embodiment, the processor 170 may control an overall operation of the vehicle system 100. For example, the processor 170 may control the battery 110, the communicator 120, the sensor 130, the display 140, the input 150, and the memory 160, respectively, and may display the user interface according to various exemplary embodiments of the present disclosure. According to an exemplary embodiment, the processor 170 (e.g., a microcontroller) may be implemented as a system on chip including a central processing unit (CPU), a graphic processing unit (GPU), a memory, or the like.

According to an exemplary embodiment, the processor 170 may receive the user input setting the navigation destination through the input 150. According to an exemplary embodiment, the processor 170 may retrieve one or more paths (first paths) from a current location (a starting point) to a destination. For example, the processor 170 may retrieve one or more paths based on the necessary time, a distance, a kind of roads (e.g., a highway or a national road), real-time traffic information, a fee for utilization of a road, and the like.

According to an exemplary embodiment, the processor 170 may confirm a current drivable distance. According to an exemplary embodiment, the processor 170 may calculate the average fuel efficiency using information about the driving distance and battery consumption sensed by the sensor 130. For example, the process or 170 may calculate the average fuel efficiency by dividing the driving distance by battery quantity (or a power amount) consumed by the motor. The processor 170 may store the calculated average fuel efficiency information in the memory 160. The processor 170 may calculate a current drivable distance using the average fuel efficiency information and a current battery amount stored in the memory 160. For example, the processor 170 may calculate the current drivable distance by multiplying the average fuel efficiency information and the current battery amount.

According to an exemplary embodiment, the processor 170 may calculate the current drivable distance based on the real-time traffic information. For example, the processor 170 may correct the average fuel efficiency information using the real-time traffic information, and may calculate a drivable distance after the charging by multiplying the corrected average fuel efficiency information and a battery amount after the charging.

According to an exemplary embodiment, the processor 170 may compare the current drivable distance with a driving distance up to the destination. The driving distance up to the destination may be calculated based on one or more retrieved paths. In the case in which the retrieved path is plural, the processor 170 may calculate the driving distance of each of the plurality of paths, and may compare the driving distance of each of the plurality of paths with the current drivable distance. When the current drivable distance is smaller than a drivable distance up to the destination on the navigation application, the processor 170 may retrieve the charging station. In the case in which the retrieved path is provided in plural, if the current drivable distance is smaller than the driving distances of all paths (i.e., the drivable distances of the all paths are greater than the current drivable distance), the processor 170 may retrieve the charging station.

According to an exemplary embodiment, the processor 170 may retrieve the charging station based on at least one of a distance from the retrieved path (a first path) to the charging station, the current drivable distance, and a distance from the destination.

The various embodiments disclosed herein, including embodiments of the vehicle system 100 and/or elements thereof, can be implemented using one or more processors coupled to a memory (or other non-transitory machine readable recording medium) storing computer-executable instructions for causing the processor(s) to perform the functions described above including the functions described in relation to the communicator 120 and the input 150.

Figure 2:
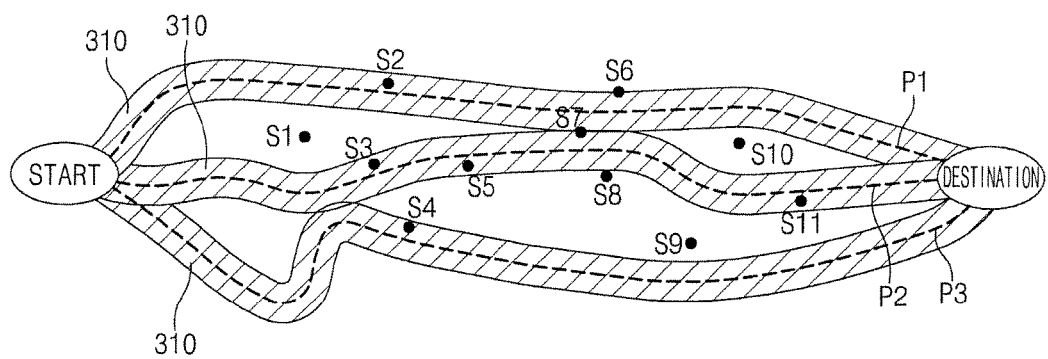
FIG. 2 is a diagram illustrating a retrieval condition of the charging station according to various exemplary embodiments of the present disclosure.

FIG. 2 is a diagram illustrating a retrieval condition of the charging station according to various exemplary embodiments of the present disclosure.

According to an exemplary embodiment, the processor 170 may retrieve the charging stations positioned within the current drivable distance. Referring to FIG. 2, 11 charging stations S1 to S11 may exist around a path from a starting point to a destination. A first charging station S1 to an eighth charging station S8 among the charging stations illustrated in FIG. 2 may be positioned within an area 210 representing the current drivable distance. Accordingly, the processor 170 may retrieve the first charging station S1 to the eighth charging station S8.

According to an exemplary embodiment, the processor 170 may retrieve the charging stations positioned within a distance designated from the destination. For example, when the battery 110 is fully charged, the processor 170 may retrieve the charging stations positioned within the drivable distance from the destination. The processor 170 may retrieve the charging station that a driver may arrive at the destination without passing through other charging stations after the battery 110 is fully charged at a specific charging station. A fourth charging station S4 to an eleventh charging station S11 among the charging stations illustrated in FIG. 2 may be positioned within an area 220 representing a drivable distance from the destination when the battery 110 is fully charged. Accordingly, the processor 170 may retrieve the fourth charging station S4 to the eleventh charging station S11.

The drivable distance of when the battery 110 is fully charged may be varied depending on the real-time traffic information. For example, even though two charging stations are positioned at the same distance from the destination, the charging station positioned around a road on which the traffic is uncongested may be retrieved, and the charging station positioned around a congested road may not be retrieved.

According to an exemplary embodiment, the processor 170 may retrieve the charging station which is positioned within the current drivable distance and is positioned within a distance designated from the destination. For example, the fourth charging station S4 to the eighth charging station S8 among the charging stations illustrated in FIG. 2 may be positioned within an area 230 in which the area 210 representing the current drivable distance and the area 220 representing the drivable distance from the destination when the battery 110 is fully charged overlap with each other. Accordingly, the processor 170 may retrieve the fourth charging station S4 to the eighth charging station S8.

Figure 3:
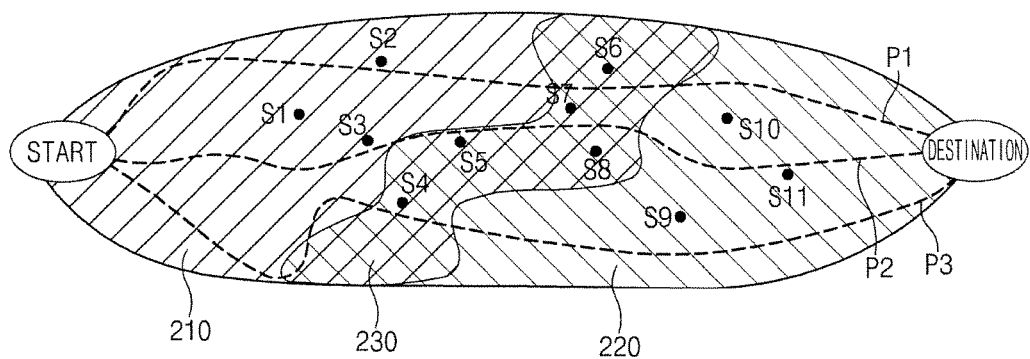
FIG. 3 is a diagram illustrating a retrieval condition of the charging station according to various exemplary embodiments of the present disclosure.

FIG. 3 is a diagram illustrating a retrieval condition of the charging station according to various exemplary embodiments of the present disclosure.

According to an exemplary embodiment, the processor 170 may retrieve a path (a first path) from a starting point to a destination in response to the user input setting the destination. For example, referring to FIG. 3, the processor 170 may retrieve three paths P1, P2, and P3 from the starting point to the destination.

According to an exemplary embodiment, the processor 170 may retrieve the charging stations positioned within a distance designated from the retrieved path (the first path). For example, the processor 170 may retrieve the charging station positioned within the distance (e.g., 3 km or 5 km) designated from each of the three paths P1, P2, and P3. Referring to FIG. 3, the 11 charging stations S1 to S11 may exist around the path from the starting point to the destination. A second charging station S2, a third charging station S3, a fourth charging station S4, a fifth charging station S5, a sixth charging station S6, a seventh charging station S7, and an eleventh charging station S11 among the charging stations illustrated in FIG. 3 may be positioned within an area 310 representing a distance designated from each of the three paths P1, P2, and P3. Accordingly, the processor 170 may retrieve the second charging station S2, the third charging station S3, the fourth charging station S4, the fifth charging station S5, the sixth charging station S6, the seventh charging station S7, and the eleventh charging station S11.

According to an exemplary embodiment, the processor 170 may retrieve the charging stations which are positioned within the current drivable distance, are positioned within a distance designated from the destination, and are positioned within a distance designated from the retrieved path (the first path). For example, the processor 170 may retrieve the fourth charging station S4 to the seventh charging station S7 positioned within the distances designated from the retrieved paths P1, P2, and P3 among the charging stations positioned within an overlapped area 330 of FIG. 3.

Figure 4:
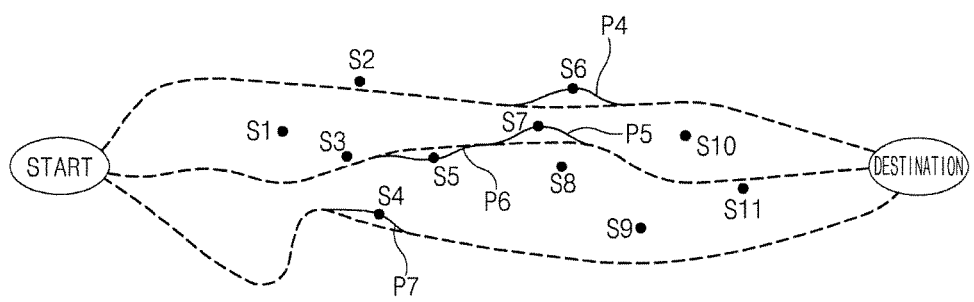
FIG. 4 is a diagram illustrating paths passing through the retrieved charging stations according to various exemplary embodiments of the present disclosure.

FIG. 4 is a diagram illustrating paths passing through the retrieved charging stations according to various exemplary embodiments of the present disclosure.

According to an exemplary embodiment, the processor 170 may retrieve one or more paths (second paths) passing through the retrieved charging station. For example, referring to FIG. 4, the processor 170 may retrieve four paths P4, P5, P6, and P7 passing through the fourth charging station to the seventh charging station S7.

According to an exemplary embodiment, the processor 170 may calculate a time taken to arrive at the destination for each of new paths (the second path). According to an exemplary embodiment, the time taken to arrive at the destination may include a driving time, a charging station waiting time, and a time taken to charge the battery.

The driving time may mean a time taken to drive from the staring point to the destination passing through the charging station. According to an exemplary embodiment, the processor 170 may calculate the driving time by reflecting the real-time traffic information received through the communicator 120.

The charging station waiting time may mean a time for which the driver needs to waits for charging the battery when all charger of the charging station are used. When there is an available charger at the time of arriving at the charging station, the charging station waiting time may be excluded from the time taken to arrive at the destination. According to an exemplary embodiment, the processor 170 may receive charging information from the retrieved charging stations through the communicator 120. The charging information may include, for example, at least one of whether or not each of chargers is used, a charging complete time of the charger which is being used, and a charging reservation state. According to an exemplary embodiment, the processor 170 may calculate the charging station waiting time based on the charging information received from the charging stations. For example, the processor 170 may confirm whether or not there is the charger available at a charging station arrival expected time, and may exclude the charging station waiting time from the time taken to arrive at the destination when there is the available charger. When there is no available charger, the processor 170 may confirm the charging complete time or the reservation state of the charger to calculate a waiting time necessary to use the charger.

The time taken to charge the battery may be varied depending on a charging amount of the battery. According to an exemplary embodiment, the processor 170 may receive a user input selecting the charging amount of the battery 110. The processor 170 may set the charging amount so that the battery 110 is fully charged or is charged as much as an amount necessary to arrive at the destination in response to the user input. The processor 170 may calculate a time taken to charge the battery as much as the set charging amount from a current battery quantity. According to an exemplary embodiment, when the battery 110 is set to be fully charged, the processor 170 may calculate the time taken to charge the battery by taking account of a power amount consumed to arrive at the charging station from the starting point. For example, the charging amount of the case in which the battery is fully charged is as follow.

Charging Amount=Battery Quantity in Fully Charged−Current Battery Amount+Power Amount Consumed to Arrived at Destination from Starting Point The processor 170 may calculate the time taken to charge the battery by dividing the required charging amount by charging capacity of the charger.

According to an exemplary embodiment, in the case in which the battery 110 is set to be charged as much as an amount necessary to arrive at the destination, the processor 170 may calculate the time taken to charge the battery, including power necessary to arrive at the charging stations positioned around the destination. That is, the time taken to charge the battery may include a time necessary to charge power necessary to arrive at the destination and a time for charging power necessary to arrive at the charging stations positioned around the destination.

According to an exemplary embodiment, the charging stations positioned around the destination may be the charging station positioned in a direction from the destination to the starting point. In general, since the vehicle often returns to the starting point after arriving at the destination, the processor 170 may retrieve the charging stations positioned in the direction from the destination to the starting point, and may calculate the power quantity necessary to arrive at the corresponding charging station from the destination. For example, the charging amount of the battery of the case in which the battery 10 is set to be charged as much as an amount necessary to arrive at the destination is as follow.

Charging Amount=Power Quantity Consumed to Arrive at Charging Station from Starting Point+Power Quantity Consumed to Arrive at Destination from Charging Station+Power Quantity Consumed to Arrive at Charging Station around Destination from Destination−Current Battery Amount The processor 170 may calculate the time taken to charge the battery by dividing the required charging amount by charging capacity of the charger.

The processor 170 may display one or more second paths passing through the charging station on the display 140. According to an exemplary embodiment, the processor 170 may simultaneously display a time taken to arrive at the destination for each of one or more second paths.

The processor 170 may select one path among the paths (the second paths) passing through the charging station based on the time taken to arrive at the destination. According to an exemplary embodiment, the processor 170 may select a path in which a minimum time is taken to arrive at the destination, among the second paths. According to an exemplary embodiment, the processor 170 may receive a user input selecting one of the second paths through the input 150, and may select the second path in response to the received user input.

The processor 170 may perform path guidance along the selected path. For example, the processor 170 may display a driving direction, or the like according to the selected path on the display 140, or may perform voice guidance through a speaker (not shown).

According to an exemplary embodiment, the processor 170 may perform a charging reservation for the charging station included in the selected path through the communicator 120. For example, if there is a charger available at a charging station arrival expected time, the processor 170 may perform the charging reservation so that the battery is charged as much as a set charging amount at the corresponding time. As another example, if there is no charger available at the charging station arrival expected time, the processor 170 may perform the charging reservation so that the battery may be charged using a charger which may be most quickly used. According to an exemplary embodiment, in the case in which the selected path is changed or the path guidance is canceled, the processor 170 may canceled the charging reservation through the communicator 120.

Figure 5:
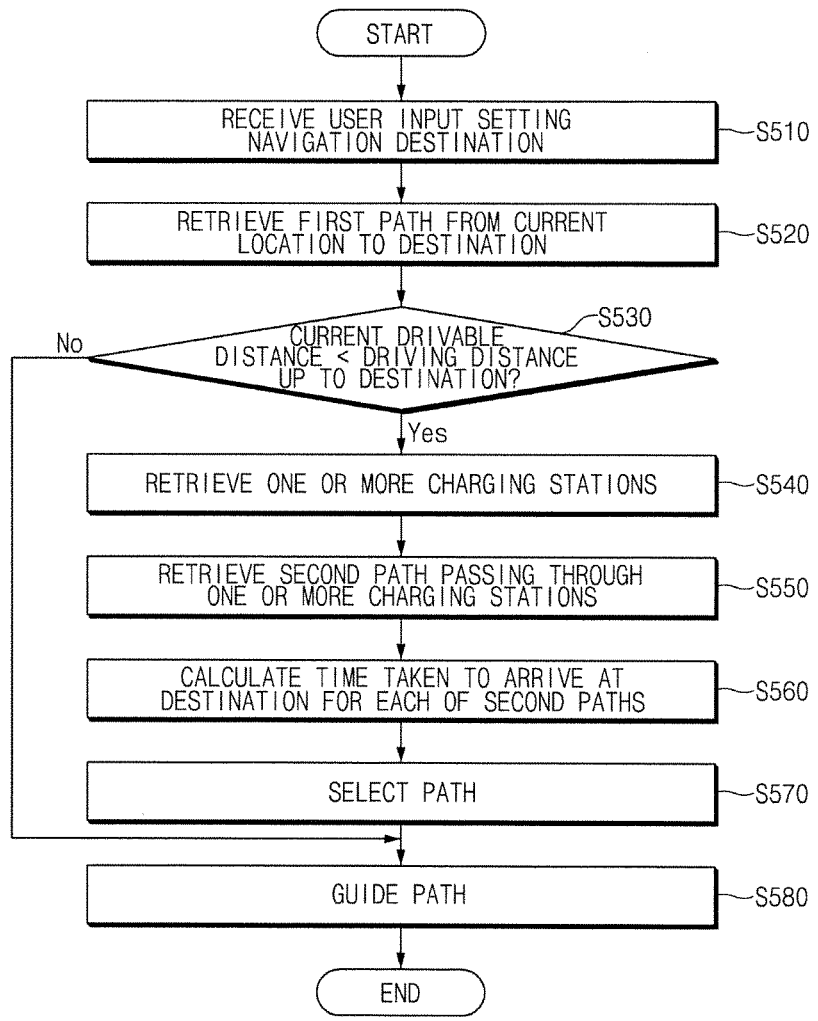
FIG. 5 is flowchart illustrating a navigation path selecting method of a vehicle system according to various exemplary embodiments of the present disclosure.

FIG. 5 is flowchart illustrating a navigation path selecting method of a vehicle system according to various exemplary embodiments of the present disclosure.

The flowchart illustrated in FIG. 5 may include operations processed by the vehicle system 100 illustrated in FIG. 1. Accordingly, although being omitted hereinafter, the contents described with connection with the vehicle system with reference to FIGS. 1 to 4 may also be applied to the flowchart illustrated in FIG. 5.

According to an exemplary embodiment, the vehicle system 100 may receive a user input setting a navigation destination through the input 150 (S510).

According to an exemplary embodiment, the vehicle system 100 may retrieve one or more first paths from a current location to a destination (S520). For example, the processor 170 may retrieve one or more paths based on the necessary time, a distance, a kind of roads (e.g., a highway or a national road), real-time traffic information, a fee for utilization of a road, and the like.

According to an exemplary embodiment, the vehicle system 100 may confirm whether a current drivable distance is smaller than a driving distance up to the destination (S530). The vehicle system 100 may calculate the current drivable distance and the driving distance up to the destination, and may compare the current drivable distance and the driving distance up to the destination.

According to an exemplary embodiment, the vehicle system 100 may calculate average fuel efficiency using driving distance information and battery consumption sensed by the sensor 130. The vehicle system 100 may calculate the current drivable distance using the average fuel efficiency information and a current battery quantity. According to an exemplary embodiment, the vehicle system 100 may calculate the current drivable distance based on real-time traffic information. The vehicle system 100 may calculate the driving distance up to the destination based on one or more retrieved paths. When the retrieved path is plural, the processor 170 may calculate the driving distance of each of the plurality of paths, and may compare the driving distance of each of the plurality of paths with the current drivable distance.

According to an exemplary embodiment, if the current drivable distance is greater than the driving distance up to the destination (No in S530), the vehicle system 100 may perform path guidance (S580). For example, the vehicle system 100 may perform the path guidance along one of the first paths retrieved in S520.

According to an exemplary embodiment, if the current drivable distance is smaller than the driving distance up to the destination (Yes in S530), the vehicle system 100 may retrieve the charging stations which are able to arrive with the current drivable distance (S540). According to an exemplary embodiment, the vehicle system 100 may retrieve the charging stations based on at least one of a distance from the first path to the charging station, the current drivable distance, and a distance from the destination. For example, the vehicle system 100 may retrieve the charging stations positioned within the current drivable distance. As another example, the vehicle system 100 may retrieve the charging stations which are positioned within the current drivable distance and are positioned within a distance designated from the destination. As still another example, the vehicle system 100 may retrieve the charging stations which are positioned within the current drivable distance, are positioned within the distance designated from the destination, and are positioned within a distance designated from the retrieved path (the first path).

According to an exemplary embodiment, the vehicle system 100 may retrieve one or more second paths passing through the charging station (S550).

According to an exemplary embodiment, the vehicle system 100 may calculate a time taken to arrive at the destination for each of one or more second paths (S560). According to an exemplary embodiment, the time taken to arrive at the destination may include a driving time, a charging station waiting time, and a time taken to charge the battery.

According to an exemplary embodiment, the vehicle system 100 may receive charging information from the retrieved charging stations through the communicator 120. The charging information may include, for example, at least one of whether or not each of chargers is used, a charging complete time of the charger which is being used, and a charging reservation state. According to an exemplary embodiment, the vehicle system 100 may calculate the charging station waiting time based on the charging information received from the charging stations.

According to an exemplary embodiment, the vehicle system 100 may receive a user input selecting the charging amount of the battery 110. The vehicle system 100 may set the charging amount so that the battery 110 is fully charged or is charged as much as an amount necessary to arrive at the destination in response to the user input. The vehicle system 100 may calculate a time taken to charge the battery as much as the set charging amount from a current battery quantity.

According to an exemplary embodiment, in the case in which the battery 110 is set to be fully charged, the vehicle system 100 may calculate the time taken to charge the battery by taking account of a power amount consumed to arrive at the charging station from the starting point. According to an exemplary embodiment, in the case in which the battery 110 is set to be charged as much as an amount necessary to arrive at the destination, the vehicle system 100 may calculate the time taken to charge the battery, including power necessary to arrive at the charging stations positioned around the destination. That is, the time taken to charge the battery may include a time necessary to charge power necessary to arrive at the destination and a time for charging power necessary to arrive at the charging stations positioned around the destination. The charging stations positioned around the destination may be the charging station positioned in a direction from the destination to the starting point.

When one or more second paths are retrieved, the vehicle system 100 may display one or more retrieved second paths on the display. According to an exemplary embodiment, the vehicle system 100 may simultaneously display the time taken to arrive at the destination for each of one or more second paths.

The vehicle system 100 may select one of one or more second paths based on the time taken to arrive at the destination (S570). For example, the vehicle system 100 may select a path in which a minimum time is taken to arrive at the destination, among the second paths. As another example, the vehicle system 100 may receive a user input selecting one of the second paths through the input, and may select the second path in response to the received user input.

The vehicle system 100 may perform path guidance along the selected path. For example, the vehicle system 100 may display a driving direction, or the like according to the selected path on the display 140, or may perform voice guidance through a speaker (not shown).

According to an exemplary embodiment, the vehicle system 100 may perform a charging reservation for the charging station included in the selected path through the communicator. When the selected path is changed or the path guidance is canceled, the vehicle system 100 may cancel the charging reservation through the communicator 120.

As described above, according to the exemplary embodiments of the present disclosure, in the case in which it is impossible to drive up to the navigation destination in the environment in which the charging station infrastructure is insufficient, the vehicle system may select the optimal path passing through the charging station to guide the path.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle system comprising:
   an input; and
   a processor configured to:
      receive a user input which sets a navigation destination through the input;
      retrieve one or more first paths from a current location to the navigation destination;
      retrieve charging stations which are able to arrive with a current drivable distance when the current drivable distance is smaller than a driving distance to the navigation destination;
      retrieve one or more second paths passing through the charging stations;
      calculate a time taken to arrive at the navigation destination for each of the one or more second paths; and
      select one path of the one or more second paths based on the time taken to arrive at the navigation destination,
   wherein the time taken to arrive at the navigation destination includes a driving time, a charging station waiting time, and a time taken to charge the battery, and
   wherein the time taken to charge the battery includes a time necessary to charge power necessary to arrive at the navigation destination and a time for charging power necessary to arrive at the charging stations positioned around the navigation destination for recharging after arriving at the navigation destination.

2. The vehicle system according to claim 1, wherein the processor is further configured to select a path in which a minimum time is taken to arrive at the navigation destination, among the one or more second paths.

3. The vehicle system according to claim 1, further comprising a display,
   wherein the processor is configured to display the one or more second paths on the display.

4. The vehicle system according to claim 1, wherein the charging stations positioned around the navigation destination include charging stations positioned in a direction from the navigation destination to the current position.

5. A vehicle system comprising:
an input;
a communicator; and
a processor configured to:
receive a user input which sets a navigation destination through the input;
retrieve one or more first paths from a current location to the navigation destination;
retrieve charging stations which are able to arrive with a current drivable distance when the current drivable distance is smaller than a driving distance up to the navigation destination;
retrieve one or more second paths passing through the charging stations;
calculate a time taken to arrive at the navigation destination for each of the one or more second paths; and
select one path of the one or more second paths based on the time taken to arrive at the navigation destination,
wherein the time taken to arrive at the navigation destination includes a driving time, a charging station waiting time, and a time taken to charge the battery,
wherein the time taken to charge the battery includes a time necessary to charge power necessary to arrive at the navigation destination and a time for charging power necessary to arrive at the charging stations positioned around the navigation destination for recharging after arriving at the navigation destination, and
wherein the processor is configured to receive charging information including at least one of whether or not each of chargers is used, a charging complete time of a vehicle which is being charged, and a charging reservation state from the charging stations through the communicator, and to calculate the charging station waiting time based on the charging information.

6. The vehicle system according to claim 5, wherein the processor is further configured to select a path in which a minimum time is taken to arrive at the navigation destination, among the one or more second paths.

7. The vehicle system according to claim 5, further comprising a display,
wherein the processor is further configured to display the one or more second paths on the display.

8. The vehicle system according to claim 5, wherein the processor is further configured to perform a charging reservation for the charging stations included in the selected path through the communicator.

9. The vehicle system according to claim 8, wherein the processor is further configured to perform a cancellation of the charging reservation for the charging stations included in the selected path through the communicator when the selected path is canceled.

10. A navigation path selecting method of a vehicle system, the navigation path selecting method comprising steps of:

receiving, by a processor, a user input which sets a navigation destination through an input;
retrieving, by the processor, one or more first paths from a current location to the navigation destination;
retrieving, by the processor, charging stations which are able to arrive with a current drivable distance when the current drivable distance is smaller than a driving distance up to the navigation destination;
retrieving, by the processor, one or more second paths passing through the charging stations;
calculating, by the processor, a time taken to arrive at the navigation destination for each of the one or more second paths; and
selecting, by the processor, one path of the one or more second paths based on the time taken to arrive at the navigation destination,
wherein the time taken to arrive at the navigation destination includes a driving time, a charging station waiting time, and a time taken to charge the battery, and
wherein the time taken to charge the battery includes a time necessary to charge power necessary to arrive at the navigation destination and a time for charging power necessary to arrive at the charging stations positioned around the navigation destination for recharging after arriving at the navigation destination.

11. The navigation path selecting method according to claim 10, wherein the step of selecting the one path of the one or more second paths includes selecting a path in which a minimum time is taken to arrive at the navigation destination, among the one or more second paths.

12. The navigation path selecting method according to claim 8, further comprising displaying the one or more second paths on a display.

13. The navigation path selecting method according to claim 10, wherein the charging stations positioned around the navigation destination include charging stations positioned in a direction from the navigation destination to the current position.

14. The navigation path selecting method according to claim 10, wherein the step of calculating the time taken to arrive at the navigation destination for each of the second paths includes:
receiving charging information including at least one of whether or not each of chargers is used, a charging complete time of a vehicle which is being charged, and a charging reservation state from the charging stations through a communicator; and
calculating the charging station waiting time based on the charging information.

15. The navigation path selecting method according to claim 14, further comprising performing a charging reservation for the charging stations included in the selected path through the communicator.

16. The navigation path selecting method according to claim 15, further comprising performing a cancellation of the charging reservation for the charging stations included in the selected path through the communicator when the selected path is canceled.

* * * * *